United States Patent
Jacquemont et al.

(10) Patent No.: US 10,506,518 B2
(45) Date of Patent: Dec. 10, 2019

(54) RADIO MODULE, CORRESPONDING DEVICE AND PROGRAM

(71) Applicant: INGENICO GROUP, Paris (FR)

(72) Inventors: Nicolas Jacquemont, Montmeyran (FR); Olivier Berthiaud, Cornas (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/739,891

(22) PCT Filed: Jun. 24, 2016

(86) PCT No.: PCT/EP2016/064762
§ 371 (c)(1),
(2) Date: Dec. 26, 2017

(87) PCT Pub. No.: WO2016/207410
PCT Pub. Date: Dec. 29, 2016

(65) Prior Publication Data
US 2018/0376426 A1    Dec. 27, 2018

(30) Foreign Application Priority Data

Jun. 26, 2015  (FR) ...................................... 15 56009

(51) Int. Cl.
*H04B 1/38*    (2015.01)
*H04W 52/02*   (2009.01)
(Continued)

(52) U.S. Cl.
CPC .......... *H04W 52/0277* (2013.01); *H04B 7/26* (2013.01); *G06Q 20/305* (2013.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01)

(58) Field of Classification Search
CPC .... H04W 52/0277; H04W 88/02; H04B 7/62; G06Q 20/305; H04M 1/72519; H04M 1/72522
USPC ...................................... 455/574, 550.1, 407
See application file for complete search history.

(56) References Cited

U.S. PATENT DOCUMENTS 6,832,718 B2    12/2004  Sarradin
7,389,088 B2 *   6/2008  Kim .................... H04W 52/245
                                                        370/337
(Continued)

FOREIGN PATENT DOCUMENTS

FR    2803071 A1    6/2001
GB    2352344 A     2/2001

OTHER PUBLICATIONS

English Translation of the International Preliminary Report on Patentability dated Jan. 25, 2017 for corresponding International Application No. PCT/EP2016/064762, filed Jun. 24, 2016.
(Continued)

*Primary Examiner* — Danh C Le
(74) *Attorney, Agent, or Firm* — David D. Brush; Westman, Champlin & Koehler, P.A.

(57) ABSTRACT

A radio module includes a first baseband part, a second radiofrequency part, a first power supply interface for the baseband part and a second power supply interface for the second radiofrequency part.

7 Claims, 2 Drawing Sheets

(51) Int. Cl.
*H04B 7/26* (2006.01)
*G06Q 20/30* (2012.01)

(56) References Cited

U.S. PATENT DOCUMENTS

| | | | | |
|---|---|---|---|---|
| 9,414,309 | B2* | 8/2016 | Golla | H04W 52/0296 |
| 2011/0294445 | A1* | 12/2011 | Goto | H01P 1/15 |
| | | | | 455/83 |
| 2012/0207252 | A1* | 8/2012 | Levesque | H02M 3/07 |
| | | | | 375/342 |
| 2013/0201172 | A1* | 8/2013 | Jeong | G09G 3/3233 |
| | | | | 345/212 |
| 2014/0050282 | A1* | 2/2014 | Watanabe | H03F 1/3247 |
| | | | | 375/296 |
| 2014/0146723 | A1* | 5/2014 | Chang | H04W 52/0206 |
| | | | | 370/311 |
| 2015/0028673 | A1* | 1/2015 | Uchida | H02J 7/025 |
| | | | | 307/31 |
| 2015/0119102 | A1* | 4/2015 | Saji | H04B 1/38 |
| | | | | 455/550.1 |
| 2015/0234399 | A1* | 8/2015 | Chamberlain | H02H 9/045 |
| | | | | 455/561 |
| 2017/0003642 | A1* | 1/2017 | Yoda | G03G 15/80 |
| 2017/0019134 | A1* | 1/2017 | Zhou | H04M 1/24 |
| 2017/0039955 | A1* | 2/2017 | Park | G09G 3/3233 |
| 2017/0181107 | A1* | 6/2017 | Roji | H04L 25/00 |
| 2017/0188182 | A1* | 6/2017 | Jin | H04B 1/0014 |
| 2017/0279470 | A1* | 9/2017 | Lee | H04B 1/04 |
| 2018/0248578 | A1* | 8/2018 | Li | H04B 1/06 |

OTHER PUBLICATIONS

International Search Report dated Aug. 3, 2016 for corresponding International Application No. PCT/EP2016/064762, filed Jun. 24, 2016.
Written Opinion of the International Searching Authority dated Aug. 3, 2016 for corresponding International Application No. PCT/EP2016/064762, filed Jun. 24, 2016.
International Preliminary Report on Patentability dated Jan. 25, 2017 for corresponding International Application No. PCT/EP2016/064762, filed Jun. 24, 2016.
Chunlei Shi et al., "A Highly Integrated Power Management IC for Advanced Mobile Application", IEEE Hournal of Solid-State Circuits, IEEE Service Center, Piscataway, NJ, USA, vol. 42, No. 8, Aug. 1, 2007 (Aug. 1, 2007), pp. 1723-1732, XP011188665.

* cited by examiner

RADIO MODULE, CORRESPONDING DEVICE AND PROGRAM

CROSS-REFERENCE TO RELATED APPLICATIONS

This Application is a Section 371 National Stage Application of International Application No. PCT/EP2016/064762, filed Jun. 24, 2016, which is incorporated by reference in its entirety and published as WO 2016/207410A1 on Dec. 29, 2016, not in English.

1. FIELD OF THE INVENTION

The proposed technique relates to the management of electrical energy in mobile devices. The proposed technique relates more specifically to the management of energy in mobile devices comprising sending and transmission means. The proposed technique relates more specifically to the field of data sending and transmission modules using wireless channels integrated into the mobile devices. Such modules are also called RF or radiofrequency modules. The propose technique relates more particularly to the management of the power supply for RF modules. The proposed technique can be applied especially in mobile electronic devices such as payment terminals.

2. PRIOR ART

Mobile electronic devices such as tablets and payment terminals are extensively used in daily life. These devices are often provided with radio modules that enable connection to communication networks such as the Internet. For example, a payment terminal normally comprises a functional module for the management of payment and a radio module to carry out communications with a payment server to enable financial transactions with remote servers.

It is often difficult to integrate these radio functions by reconciling the constraints related to the different functions of these devices and the constraint related to weight, compactness and cost. One of the major constraints relates to the management of energy. Indeed, the mobile devices are powered by one or more batteries of limited capacity. As a rule, such a device has a single battery. Now, radio modules are energy-hungry devices and require a regulated power supply.

FIG. 1 illustrates a general architecture of the power supply for a prior-art mobile communications device. This mobile communications device comprises an internal regulated power supply that powers a functional module to carry out the main functions of the mobile communications device (display, entry, data processing, etc.) and a regulated power supply for the radio module that powers the radio module. When the mobile communications device is a payment terminal, the regulated power supply also takes charge of the processing of transactions comprising for example the obtaining of data coming from a payment means, the verification of a personal identification code, the encryption and decryption of data etc. In the example of FIG. 1, the internal regulated power supply provides an output voltage of 3.3V and an output current of 100 mA. Thus, as can be seen, the power of the functional module is relatively low.

By contrast, the power of the radio module is appreciably higher, especially during the period of transmission and/or reception of signals. The regulated power supply for the radio module has to be capable of giving an output voltage of 3.6 volts and an average output current of 900 mA (and up to 1.8 A in peak voltage). The required power is therefore about ten to twenty times greater.

This architecture for the powering of a mobile communications device integrating a radio module entails major losses in energy efficiency. Indeed, regulated power supplies are the apparatuses that consume energy. These apparatuses contribute an additional power loss. In the example, the regulated power supply set up for the radio module has a yield of the order of 80%. This yield has a visible impact on the autonomy of the terminal.

There is therefore a need to provide a solution that meets the problems of energy efficiency and autonomy of devices integrating radio modules.

3. SUMMARY

The present disclosure does not have at least some of the problems raised by the prior art. The proposed technique relates to a radio module comprising a first baseband part and a second radiofrequency part. According to the present technique, said module comprises a first power supply interface for said baseband part and a second power supply interface for said second radiofrequency part.

Thus, the module can be powered by two different power supply systems. It no longer requires the powering of the radio module by a single regulated power supply.

According to one particular characteristic, said first power supply interface has a fixed nominal voltage and said second power supply interface has a variable nominal voltage.

Thus, the second radiofrequency part can be powered by a non-regulated power supply, by means of the second power supply interface.

According to one particular characteristic, said radio module implements at least one of the following communications techniques: Wi-Fi, GPRS, CDMA, EDGE, UMTS, HSPDA and LTE.

According to another aspect, the invention also relates to an electronic device comprising a functional module that comprises a radio module as described here above.

According to one particular characteristic, such a device comprises a regulated power supply and a high-power supply, said high-power supply being connected to the second power supply interface, said regulated power supply being connected to the first power supply interface.

According to one particular characteristic, said regulated power supply is powered by said high-power supply, said high-power supply being a battery.

Thus, the second radiofrequency part of the radio module is directly powered by the battery. This avoids loss of energy caused by intermediate apparatuses.

According to one particular characteristic, the device comprises a detector of voltage of said battery.

Thus, the entire capacity of the battery can be used with the utmost efficiency.

According to another particular embodiment, said functional module is powered by said regulated power supply.

Thus, the regulated power supply is re-utilized to power both the functional module and the first baseband part of the radio module. It is no longer necessary to provide a second regulated power supply to power the radio module.

According to one particular embodiment, said regulated power supply has an output voltage of 3V, said high-power supply has a variable voltage of 2.8 to 4.2V.

According to one particular embodiment, the device comprises a switch for cutting off the power supply of the second power supply interface of said radio module.

Thus, the device can be switched into an energy savings mode speedily and efficiently.

According to one particular embodiment, said electronic device is a payment terminal.

The proposed technique also relates to a method for managing an electrical power supply for a radio module comprising a first baseband part and a second radiofrequency part each comprising an independent power supply interface. A method comprises a step for measuring a voltage of a power supply source of an electronic device within which the radio module is installed. Depending on the voltage measured and the presence of a piece of data to be transmitted or received by the electronic device, the method also comprises a step for activating or deactivating the second part of the radio module.

Thus, such a method is used for the management of the available energy in a simple and efficient manner to carry out transmission and reception of data by means of the radio module.

According to a preferred embodiment, the different steps of the methods according to the proposed technique are implemented by one or more software programs or computer programs comprising software instructions to be executed by a data processor of a relay module according to the proposed technique and being designed to command the execution of the different steps of the methods.

The proposed technique is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The proposed technique is also aimed at providing an information medium readable by a data processor, and comprising instructions of a program as mentioned here above.

The information medium can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Furthermore, the information medium can be a transmissible medium such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component as to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc.) and is capable of accessing the hardware resources of this physical entity (memories, recording media, communications buses, input/output electronic boards, user interfaces etc.).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, smart card, a memory card, an electronic board for the execution of firmware etc.

Each component of the system described here above can of course implement its own software modules.

The different embodiments mentioned here above can be combined with one another to implement the proposed technique.

4. FIGURES

Other features and advantages of the invention shall appear more clearly from the following description of one particular embodiment of the disclosure given by way of simple illustratory and non-exhaustive example and from the appended drawings, of which:

FIG. 1, already commented upon, illustrates an internal architecture of the power supply of a payment terminal;

5. DESCRIPTION

It is an object of the present invention is to improve the energy efficiency and autonomy of a mobile communications device integrating a radio module. The inventors have noted that the efficiency of the power supply of the radio module has a particularly major impact on autonomy. The general principle of the proposed technique consists in modifying the power supply of the prior-art radio module. A radio module is indeed divided into two parts:
- a first baseband part which has low power but requires a regulated power supply; and
- a second radiofrequency part which accepts a wider range of power supply and does not require a regulated power supply.

According to the proposed technique, the two parts of the radio module can be powered separately, respectively by means of a first power supply interface and a second power supply interface.

Figure 1:
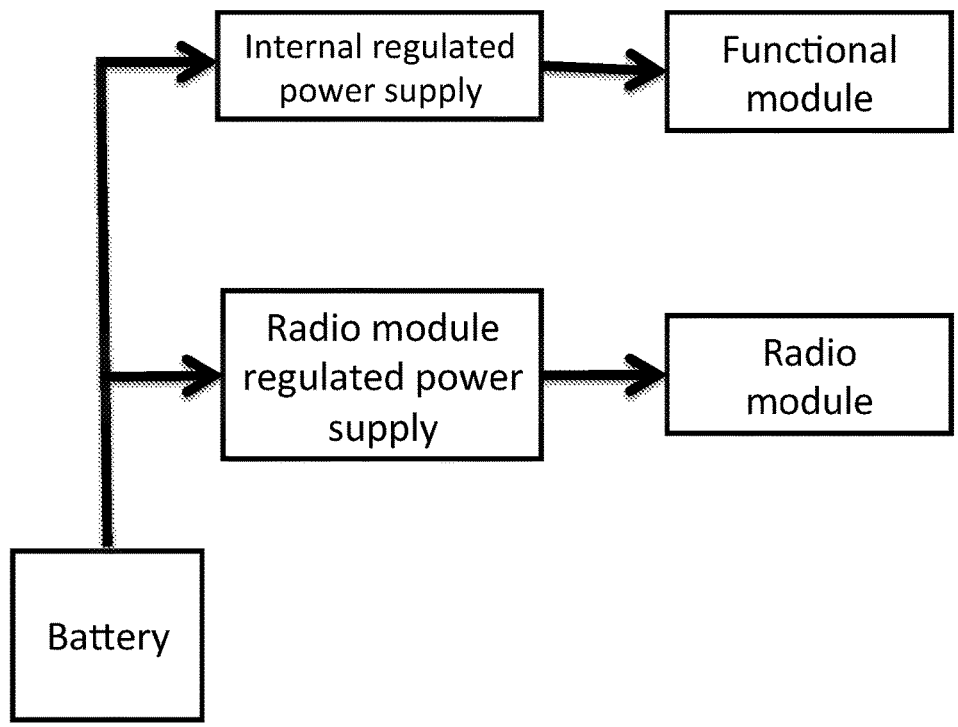
Figure 2:
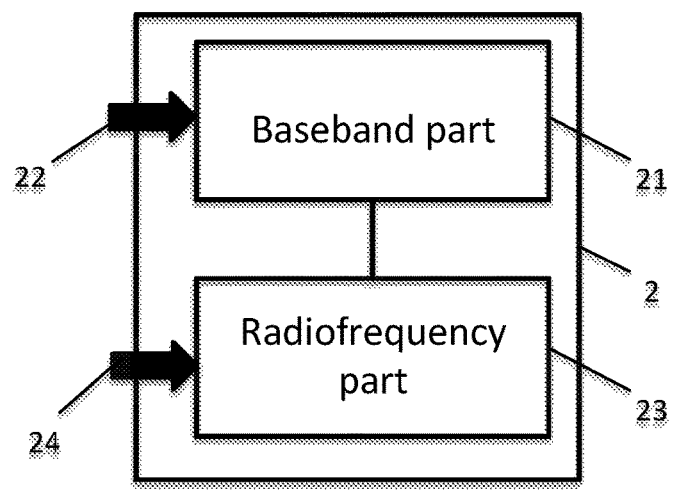
FIG. 2 illustrates the architecture of a radio module according to the proposed technique.

FIG. 2 illustrates the architecture of a radio module according to the proposed technique. The radio module 2 comprises a first baseband part 21 and a second radiofrequency part 23. The first baseband 21 can include the analog circuits and components that work in baseband, and the digital circuits and components (example processor, MMI interface, i.e. memory interfaces: RAM, flash memory). This first baseband part 21 is not energy hungry. However, it requires a regulated power supply, 3.3V for example, capable of providing 100 to 200 mA. The baseband part corresponds therefore to the processor of the module and to signal processing (DSP or digital signal processing) and to the memories; it also includes a part for interfacing with a SIM card comprising information on the subscriber and his subscription. These components are subjected to stringent power supply constraints. For example, the SIM cards are powered directly by the module. These SIM cards have an input power supply voltage generally of 3.3V or 1.8V. This input voltage should not vary. The baseband part therefore enables the management of all the functions that do not bring the network or an external link into play. These functions do not consume a great amount of instantaneous energy but need to be well regulated.

The second radiofrequency part 23 can include the circuits and the components (especially the amplifiers, the antennas, etc.) that work in radiofrequency. This second part of the radio module 23 requires a power supply (more than 1 A in peak current). However, it does not require a regulated power supply and accepts a wider range of power supply (for example, from 3.0V to 4.2V). The radiofrequency part 23 corresponds to the amplification chains for the signals in the different frequency bands. It generally comprises a transceiver (transmitter/receiver) that shapes the signals according to the type of modulation and frequency and is responsible for amplifying these signals in order to transmit them at a determined power level. The output signal is sent up to the antenna which is in charge of "broadcasting" it. The power supply ranges of these components are wider than is the case for the components of the baseband but are far more energy consuming.

The radio module 2 also comprises a first power supply interface 22 and a second power supply interface 24 that respectively enable the two external power supplies (or the single external power supply) to supply the first baseband part 21 and a second radiofrequency part 23.

The radio module 2 can implement communications technique of every type. These include but are not limited to the mobile telecommunications standards (2G, 3G, 4G, 5G) and to standards covering wireless networks (IEEE 802.11 Wi-Fi, IEEE 802.15 Bluetooth, IEEE 802.16 WiMax, etc.) and GPS receivers.

According to the proposed technique, the radio module 2 can be powered by two power supplies separately. A first power supply can be connected to the first power supply interface 22 to power the first baseband part 21. This first power supply is regulated and gives a voltage of 3.3V and a current of 100 to 200 mA. A second power supply can be connected to the second power supply interface 23 to power the second radiofrequency part 23. This second power supply is an non-regulated power supply and gives variable voltage of 3.0 to 4.2V and a current of 1.8 A. Unlike the prior art according to which the radio module is powered by a regulated power supply, the module according to the proposed technique is powered only partially (the first part of the baseband 21) by a regulated power supply. The energy consumed by the second radiofrequency part is no longer given by a regulated power supply which consumes additional energy. Thus, the energy efficiency to power the radio module is improved.

Figure 3:
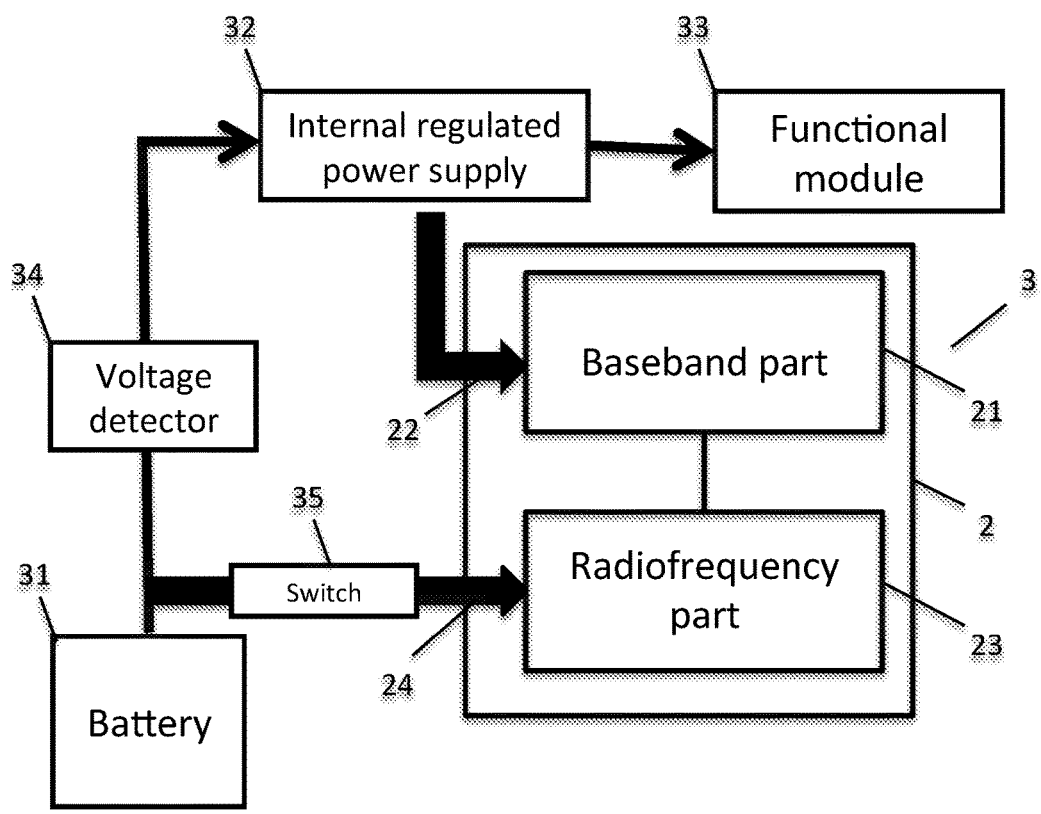
FIG. 3 illustrates the architecture of the power supply of a payment terminal according to the proposed technique.

FIG. 3 illustrates an architecture of the power supply of a payment terminal integrating a radio module of the proposed technique. This power supply architecture can be carried over to other devices integrating a radio module.

The payment terminal illustrated with reference to FIG. 3 comprises a battery 31, a regulated internal power supply 32, a functional module 33 and a radio module 2. The battery can consist of a lithium-ion cell. This is a high-power supply and gives a nominal output voltage of 3.6V. However, in practice, this voltage is often variable (for example 2.8 to 4.2V) according to the condition of the battery 31 (and especially the load condition). The functional module 33 comprises the circuits and the components (for example card reader, keypad and screen) and enables the performance of the main function of the payment terminal (all the functions except for that of communications fulfilled by the radio module). This functional module 33 requires constant input voltage (for example 3.3V) and cannot be directly powered by the battery 31. The internal regulated power supply 32 enables regulation of the voltage and current of the battery. It is powered by the battery and gives a constant voltage (e.g. 3.3V) to power the functional module 33. According to the proposed technique, the baseband part 21 of the radio module 2 is also powered by the internal regulated power supply 32 of the payment terminal 3. Thus, this internal regulated power supply 32 is re-utilized. It is no longer necessary to plan for a new regulated power supply to power the baseband part 21 of the radio module 2. The radiofrequency part 23 is directly powered by the battery 31. The range of power supply accepted (example 3.0 to 4.2V) by the second radiofrequency part 23 is included in the range of variable voltages (example 2.8 to 4.2V) given by the battery 31. The range of voltage of the battery 31 is thus better exploited. In addition, the battery is a high-power supply and makes it possible to provide peak current of the order of 1.8 A during the sending phases. The second radiofrequency part 23 is no longer necessarily powered by a regulated power supply. The loss of energy entailed by the use of a regulated power supply to power the second radiofrequency part 23 is thus avoided. The energy yield of the payment terminal 3 is therefore improved and the cost of manufacturing the terminal 3 is optimized.

Preferably, the payment terminal 3 also comprises a voltage detector 34 for the battery. The terminal 3 can monitor the instantaneous voltage of the battery. The monitoring of the voltage of the battery can be done by a processor of the terminal by executing the instructions of a computer program. If the instantaneous voltage of the battery 31 is within the range of voltage accepted by the second radiofrequency part 23, the radio module is activated. It is thus possible to make utmost use of the capacity of the battery. If the instantaneous voltage of the battery 31 is not within the range of voltage accepted by the second radiofrequency part 23, the processor of the payment terminal 3 can deactivate the radio module 2 in order to save energy and avoid damaging the radio module 2.

More specifically, in one specific embodiment, the payment terminal 3 also has a switch 35 that can be used to cut off the power supply of the second radiofrequency part 23 of the radio module 2 without entirely turning off the radio module. The switch 35 can be controlled by hand by the user or automatically by the processor of the payment terminal. It is not necessary to completely turn off the radio module to activate the "aircraft" mode. The payment terminal can thus be rapidly switched into "aircraft" mode while being able to have part of its sending/reception functions (the functions related to the baseband part) available to it. This function can for example be implemented in aircraft but can also be implemented so as not to drain the battery of the apparatus when there is no need to make transmissions. Taxi-drivers and deliverymen are examples of tradesmen for whom the payment terminal includes a 2G/3G or 4G type radio module. The fact of moving about gives rise to many changes in network conditions and therefore in battery consumption: these changes in network conditions lead to radio exchanges between the device and the network to report their respective changes to each other. This leads to transmissions and therefore contributes to the draining of the battery. It is therefore proposed to use the radio module of the present technique to switch into low-consumption mode either by hand or automatically. When the switching is done by hand, it can be implemented by means of a menu or pressure on a key. The low-consumption mode is activated by switching on the power for the radio part of the payment terminal.

This provides for a gain in autonomy and prevents any increase in the time taken to put the terminal or the module into action as compared with an existing cut-off mode. The user (or the terminal when the switching is automatic) can therefore, by this new means, activate or cut off the radio part instantaneously and, above all, without any loss in time for reactivation. The usefulness of this feature is therefore multiple: it provides a gain in autonomy, the reduction/extinguishing of radiofrequency transmissions within "sensitive" zones (aircraft, etc.).

Thus, the technique also relates to a method for managing an electrical power supply of a radio module comprising a first baseband part and a second radiofrequency part, each comprising an independent power supply interface. One method comprises a step for measuring a voltage of a power supply source of an electronic device within which the radio module is installed. Depending on the voltage measured and the presence of a piece of data to be transmitted or received by the electronic device, the technique includes a step for activating or deactivating the second part of the radio module.

Thus, such a method enables the simple and efficient management of the available energy to carry out the transmission and reception of data by means of the radio module. Indeed, when the terminal wishes neither to transmit nor to receive data (for example because the terminal is performing no transaction whatsoever), it can, by choice, totally interrupt the power supply to the second part of the module, for example when the voltage or the amperage of the power supply source is situated below a predetermined threshold (for example 50%). The electronic device measures this voltage regularly. When the voltage or the quantity of current or amperage of the power supply source surpasses the threshold, the device can choose to maintain the power supply of the second part of the radio module, for example in order to enable one or more fast handover operations of the electronic device during movement (thus, it is not necessary to wait for the implementation of a "long" handover during the repowering of the second part of the radio module), or to implement an intermittent power supply in order to transmit or receive data at regular intervals. It may be recalled that a handover designates the set of operations implemented to enable a mobile communications device to change its radio cell without interruption of conversation or transfer of data.

The handover process enables a mobile communications device to maintain the communications in progress during a movement that causes the mobile to change cells. Indeed, when the transmission signal between a telephone and a base station (BTS) weakens, the software of the mobile telephone searches for another base station available in another cell capable of ensuring communications again as efficiently as possible. Now such a process consumes a great deal of energy and time. Thus, regularly, even when no communication is in progress, the mobile communications device searches for the base stations to which it is connected to be able to immediately enter into operation when the user wishes it. The method described here above, linked with the radio module having two parts and two power supply interfaces, limits energy expenditure due to these multiple updates habitually performed by the mobile communications device.

The invention claimed is:

1. An electronic payment terminal comprising:
   a radio module comprising a first baseband part, a second radiofrequency part, a first power supply interface for said first baseband part and a second power supply interface for said second radiofrequency part;
   a regulated power supply connected to said first power supply interface;
   a high-power supply connected to said second power supply interface; and
   a functional module fulfilling functions of the payment terminal except for a communications function fulfilled by the radio module, said functional module being powered by said regulated power supply; and
   a switch for cutting off the power supply of the second power supply interface of said radio module.

2. The electronic payment terminal according to claim 1, wherein said first power supply interface has a fixed nominal voltage and said second power supply interface has a variable nominal voltage.

3. The electronic payment terminal according to claim 2, wherein said radio module implements at least one of the following communications techniques: Wi-Fi, GPRS, CDMA, EDGE, UMTS, HSPDA and LTE.

4. The electronic payment terminal according to claim 1, said regulated power supply being powered by said high-power supply, said high-power supply being a battery.

5. The electronic payment terminal according to claim 1, further comprising a detector of voltage of said battery.

6. The electronic payment terminal according to claim 1, wherein said regulated power supply has an output voltage of 3V, said high-power supply has a variable voltage of 2.8 to 4.2V.

7. An electronic payment terminal comprising:
   a radio module comprising a first baseband part, a second radiofrequency part, a first power supply interface for said first baseband part and a second power supply interface for said second radiofrequency part;
   a regulated power supply connected to said first power supply interface;
   a high-power supply connected to said second power supply interface; and
   a functional module fulfilling functions of the payment terminal except for a communications function fulfilled by the radio module, said functional module being powered by said regulated power supply,
   wherein said first power supply interface has a fixed nominal voltage and said second power supply interface has a variable nominal voltage.

* * * * *